United States Patent
Yoshizu

(10) Patent No.: US 9,162,681 B2
(45) Date of Patent: Oct. 20, 2015

(54) INFORMATION PROCESSING SYSTEM AND INFORMATION PROCESSING DEVICE

(75) Inventor: Sayaka Yoshizu, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/241,920

(22) PCT Filed: Sep. 12, 2012

(86) PCT No.: PCT/JP2012/073330
§ 371 (c)(1),
(2), (4) Date: Feb. 28, 2014

(87) PCT Pub. No.: WO2013/047206
PCT Pub. Date: Apr. 4, 2013

(65) Prior Publication Data
US 2014/0214312 A1    Jul. 31, 2014

(30) Foreign Application Priority Data

Sep. 30, 2011    (JP) ................................ P2011-217913

(51) Int. Cl.
*G06F 19/00*    (2011.01)
*G06G 7/70*    (2006.01)
(Continued)

(52) U.S. Cl.
CPC .......... *B60W 40/076* (2013.01); *B60R 16/0236* (2013.01); *G01C 9/00* (2013.01); *G01F 9/00* (2013.01); *G07C 5/0816* (2013.01); *G07C 5/008* (2013.01)

(58) Field of Classification Search
CPC .......... B60W 2550/402; B60W 50/14; B60W 10/06; B60W 10/02; B60W 2510/1005; B60W 30/18; B60W 30/19; B60W 50/10; B60W 40/076; B60W 40/12; B60W 50/16; G01C 21/3469; G01C 21/10; G01C 21/32; G01C 21/3697; G01C 21/26; G01C 21/3492; G01C 21/367; F02D 41/14; F02D 41/40; F02D 41/04; F02D 41/10; G07C 5/008; G07C 5/0825; G07C 5/0816; G07C 5/0885; G07C 5/004
USPC ............... 701/123, 24, 50, 54, 101, 411, 469, 701/31.4, 104, 1, 110, 115, 29.4, 29.6, 3; 340/438, 450, 905, 988, 990, 995.15, 340/995.22
See application file for complete search history.

(56) References Cited

U.S. PATENT DOCUMENTS 5,913,917 A * 6/1999 Murphy ..................... 701/123
6,092,021 A * 7/2000 Ehlbeck et al. ............. 701/123
(Continued)

FOREIGN PATENT DOCUMENTS

JP    A-05-256646    10/1993

*Primary Examiner* — Calvin Cheung
*Assistant Examiner* — Luis A Martinez Borrero
(74) *Attorney, Agent, or Firm* — Oliff PLC

(57) ABSTRACT

An information processing system which includes a center server and a movable body performing a communication with the center server, includes a fuel efficiency information obtainment unit which obtains information on fuel efficiency when the movable body moves in a first direction heading toward the other direction from one direction in a predetermined section and obtains information on fuel efficiency when the movable body moves in a second direction heading toward one direction from the other direction in the section; a comparison unit which compares the fuel efficiency in the first direction with the fuel efficiency in the second direction; and a slope estimation unit which estimates a slope of the section based on a difference between the fuel efficiency in the first direction and the fuel efficiency in the second direction.

4 Claims, 4 Drawing Sheets

(51) Int. Cl.
*G06G 7/76* (2006.01)
*B60W 40/076* (2012.01)
*G01F 9/00* (2006.01)
*B60R 16/023* (2006.01)
*G07C 5/08* (2006.01)
*G01C 9/00* (2006.01)
*G07C 5/00* (2006.01)

(56) References Cited

U.S. PATENT DOCUMENTS

| | | | |
|---|---|---|---|
| 6,453,731 B1 * | 9/2002 | Yaegashi | 73/114.52 |
| 6,813,550 B2 * | 11/2004 | Minami | 701/54 |
| 8,108,138 B2 * | 1/2012 | Bruce et al. | 701/420 |
| 8,116,972 B2 * | 2/2012 | Klampfl et al. | 701/123 |
| 8,155,868 B1 * | 4/2012 | Xing et al. | 701/123 |
| 8,442,783 B2 * | 5/2013 | Piszko | 702/55 |
| 8,874,303 B2 * | 10/2014 | Ishida et al. | 701/29.1 |
| 8,880,333 B2 * | 11/2014 | Calkins | 701/410 |
| 8,935,083 B2 * | 1/2015 | Bonne | 701/123 |
| 2007/0176762 A1 * | 8/2007 | Aoyagi et al. | 340/439 |
| 2007/0262855 A1 * | 11/2007 | Zuta et al. | 340/439 |
| 2010/0088011 A1 * | 4/2010 | Bruce et al. | 701/200 |
| 2010/0250059 A1 * | 9/2010 | Sekiyama et al. | 701/35 |
| 2011/0054768 A1 * | 3/2011 | Sullivan | 701/123 |
| 2011/0160990 A1 * | 6/2011 | Mineta | 701/123 |
| 2011/0160993 A1 * | 6/2011 | Tsurutani et al. | 701/200 |
| 2011/0309926 A1 * | 12/2011 | Eikelenberg et al. | 340/439 |
| 2012/0109512 A1 * | 5/2012 | Calkins | 701/415 |
| 2012/0116626 A1 * | 5/2012 | Perkins et al. | 701/22 |
| 2013/0173106 A1 * | 7/2013 | Konishi | 701/22 |
| 2013/0179062 A1 * | 7/2013 | Yasushi et al. | 701/123 |

* cited by examiner

Fig. 3
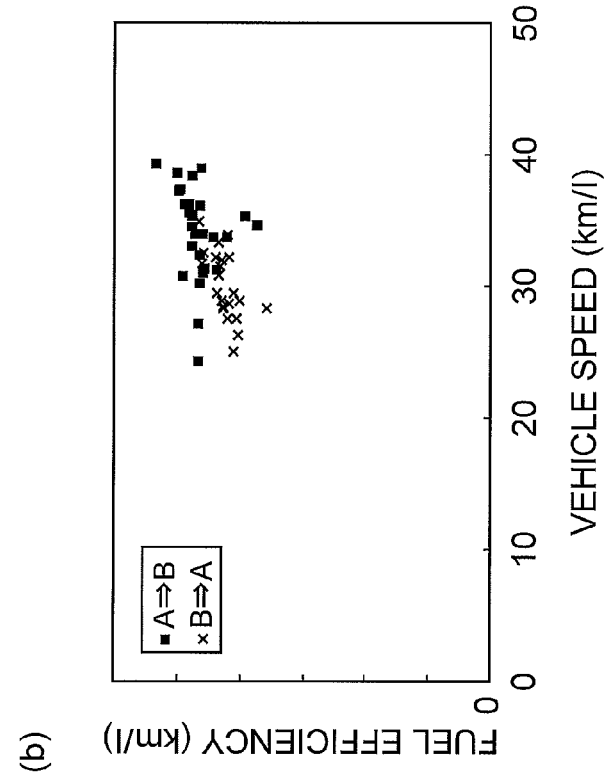
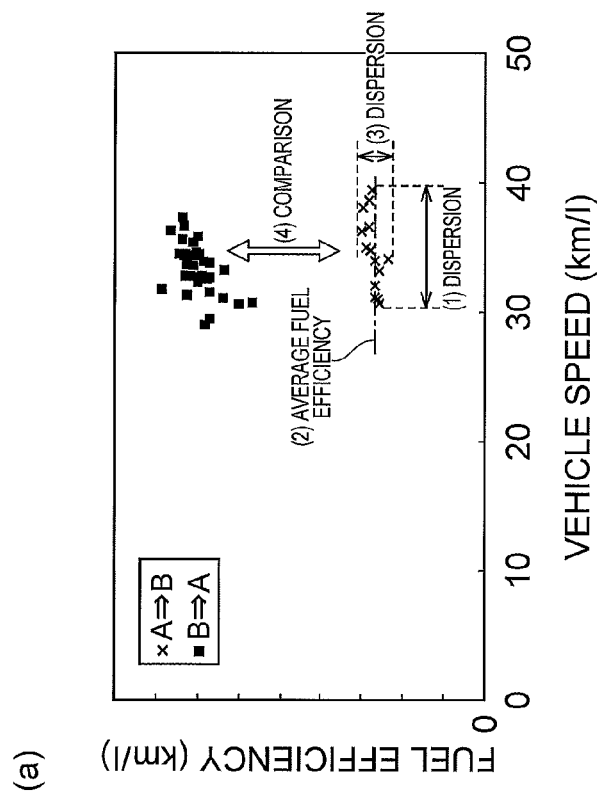

*Fig.4*
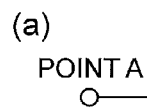
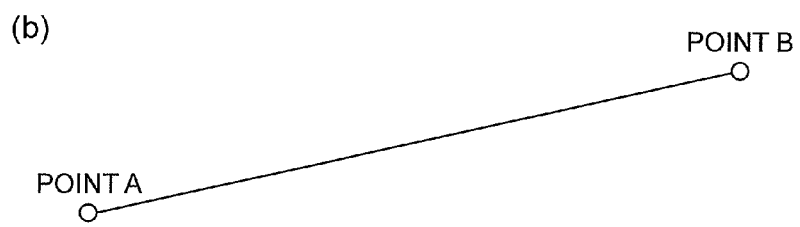
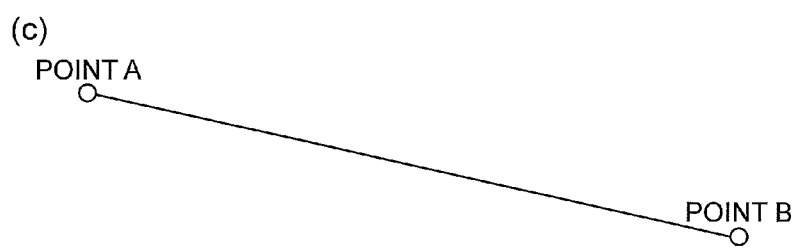
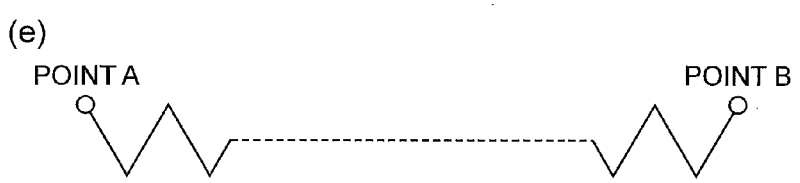

INFORMATION PROCESSING SYSTEM AND INFORMATION PROCESSING DEVICE

TECHNICAL FIELD

The present invention relates to an information processing system and an information processing device which estimates a slope.

BACKGROUND ART

In the related art, as a method for estimating a slope, it is known that an actual fuel efficiency is computed based on a travel distance and the fuel amount actually supplied to an engine while a vehicle travels, reference fuel efficiency with respect to a vehicle speed is computed from a fuel efficiency map, and the slope is estimated based on such computation result (for example, refer to Patent Literature 1).

CITATION LIST

Patent Literature

[Patent Literature 1] Japanese Unexamined Patent Application Publication No. 05-256646

SUMMARY OF INVENTION

Technical Problem

However, in the method of the related art, slope estimation is performed only after conditions of various parameters between reference fuel efficiency and actual fuel efficiency are unified. In other words, the reference fuel efficiency and the actual fuel efficiency are not compared as it is, but they are compared after compensation is performed by a computation once. Therefore, the computation for estimating the slope may become complicated. Furthermore, it is necessary to prepare the reference fuel efficiency in advance. But the reference fuel efficiencies for each vehicle model are different from each other, and thus, there is a possibility that a computation amount is further increased, so as to make the method applicable to all kinds of vehicles.

The present invention is made to solve the above described problem and an object of the present invention is to provide an information processing system and an information processing device capable of estimating a slope using a simple computation.

Solution to Problem

An information processing system which includes a center server and a movable body performing a communication with the center server provides a fuel efficiency information obtainment unit which obtains information on fuel efficiency when the movable body moves in a first direction heading toward the other direction from one direction in a predetermined section and obtains information on fuel efficiency when the movable body moves in a second direction heading toward one direction from the other direction in the section; a comparison unit which compares the fuel efficiency in the first direction with the fuel efficiency in the second direction; and a slope estimation unit which estimates a slope of the section based on a difference between the fuel efficiency in the first direction and the fuel efficiency in the second direction.

The information processing system can estimate the slope of the section using information based on an actual movement of the movable body, based on the difference between the fuel efficiency in the first direction and the fuel efficiency in the second direction. In other words, it is possible to estimate the slope by simply comparing the fuel efficiencies of the vehicle when moving in the directions different from each other, in the predetermined section. Thus, in the present method, taking a condition consistency of parameters is easier compared to the related art and a computation can be simply performed. In addition, since the estimation is performed based on the actual movement of the movable body, no reference fuel efficiency needs to be prepared, and accordingly, it is applicable to all kinds of movable bodies. As described above, according to the information processing system, the slope can be estimated by a simple computation.

Specifically, in the information processing system, the slope estimation unit estimates that the section is in an uphill slope heading toward the first direction in a case where the fuel efficiency in the second direction is higher than the fuel efficiency in the first direction and that the section is in a downhill slope heading toward the first direction in a case where the fuel efficiency in the first direction is higher than the fuel efficiency in the second direction.

In addition, in the information processing system, the slope estimation unit estimates that the section is in the uphill slope heading toward the first direction in a case where fuel efficiency dispersion in the second direction is higher than fuel efficiency dispersion in the first direction and the fuel efficiency in the second direction is higher than the fuel efficiency in the first direction, and that the section is in the downhill slope heading toward the first direction in a case where the fuel efficiency dispersion in the first direction is higher than the fuel efficiency dispersion in the second direction and the fuel efficiency in the first direction is higher than the fuel efficiency in the second direction. It is possible to more reliably estimate the slope by considering not only the difference in the fuel efficiency but also the fuel efficiency dispersion.

In addition, an information processing device includes a fuel efficiency information obtainment unit which obtains information on fuel efficiency when a movable body moves in a first direction heading toward the other direction from one direction in a predetermined section and obtains information on fuel efficiency when the movable body moves in a second direction heading toward one direction from the other direction in the section; a comparison unit which compares the fuel efficiency in the first direction with the fuel efficiency in the second direction; and a slope estimation unit which estimates a slope of the section based on a difference between the fuel efficiency in the first direction and the fuel efficiency in the second direction.

The information processing device can achieve the same effects as the above-described information processing system.

Advantageous Effects of Invention

According to the present invention, a slope can be estimated from a simple computation.

BRIEF DESCRIPTION OF DRAWINGS

FIG. 3 is a graph in which a relationship between fuel efficiency and a vehicle speed is plotted.

FIG. 4 is a view illustrating examples of a slope of a predetermined section.

DESCRIPTION OF EMBODIMENTS

Hereinafter, an embodiment of an information processing system will be described with reference to the drawings.

Figure 1:
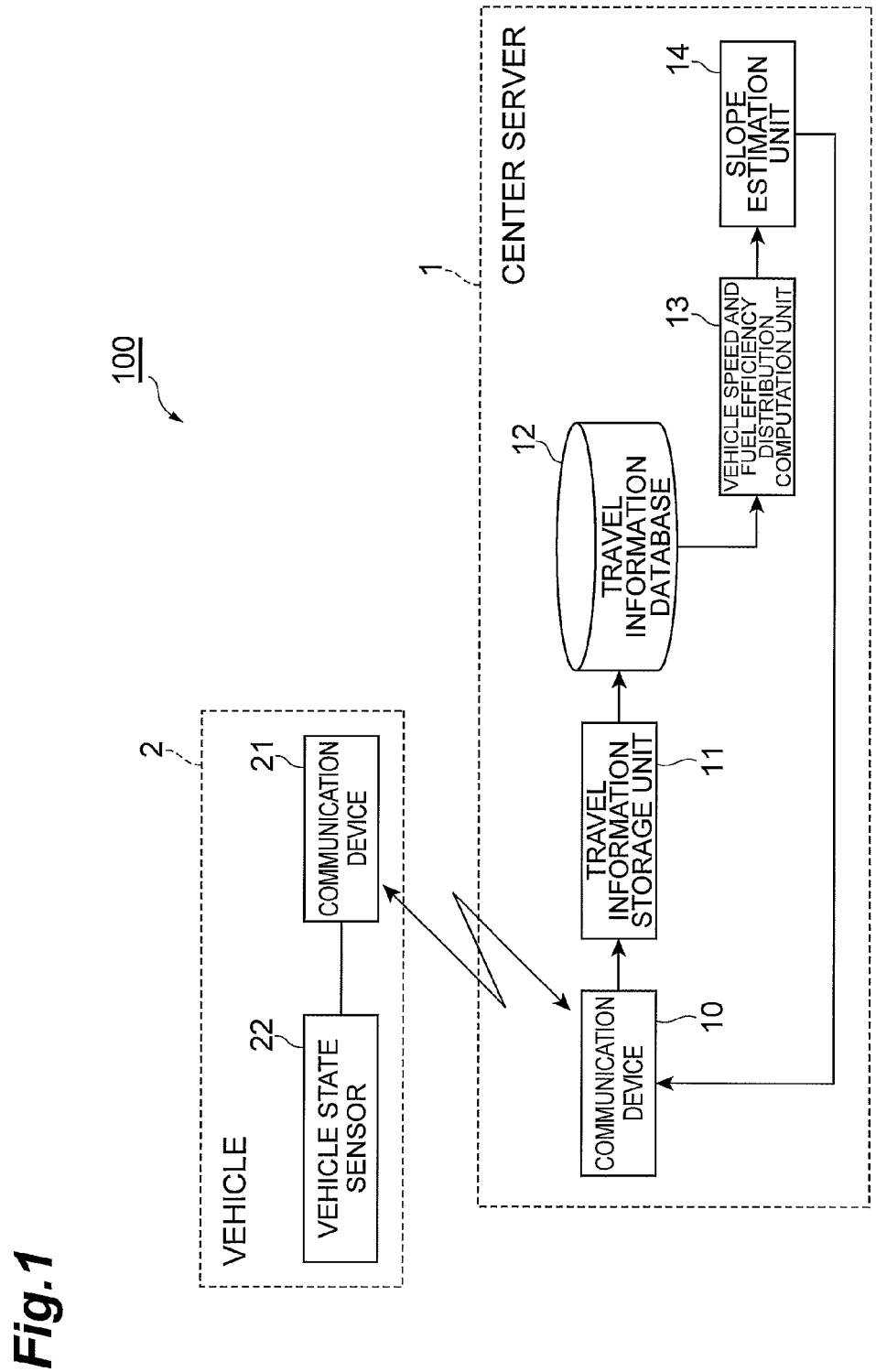
FIG. 1 is a block configuration diagram of an information processing system according to an embodiment.

As illustrated in FIG. 1, the information processing system 100 includes a center server 1 and a vehicle 2 which communicates with the center server 1. In addition, FIG. 1 illustrates only one vehicle 2, but the center server 1 can communicate with multiple vehicles 2 and obtain information from the respective vehicles 2. The information processing system 100 can estimate a slope of a predetermined section of a road, based on information on fuel efficiency obtained from the vehicle 2.

The vehicle 2 includes a communication device 21 for communicating with the center server 1 and a vehicle state sensor 22 which detects information on a vehicle state. The vehicle state sensor 22 can detect all the information on the vehicle state such as a vehicle speed, consumed fuel, and a current location. The communication device 21 can transmit the detected information on the vehicle state to the center server 1. In addition, each vehicle 2 may sequentially transmit the information on the vehicle state to the center server 1 for each travel, and may gather more than a certain amount of information to collectively transmit.

The center server 1 includes a communication device 10, a travel information storage unit 11, a travel information database 12, a vehicle speed and fuel efficiency distribution computation unit 13, and a slope estimation unit 14. The communication device 10 functions to receive information on the vehicle state transmitted from the respective vehicles 2. In addition, the communication device 10 can utilize slope information in the travel of each vehicle 2 by transmitting the slope information estimated by the center server 1 to each vehicle 2.

The travel information storage unit 11 functions to compute various travel information on the vehicle and to store the information in the travel information database 12, based on information on the vehicle state received by the communication device 10. For example, the travel information storage unit 11 functions to compute a departure place and a destination in one trip, an average vehicle speed and the fuel efficiency and to store the computed result in the travel information database 12. In addition, for example, a time period between when an engine starts and when the engine stops can be set as one trip. The travel information database 12 is able to keep managing the information for each user.

The vehicle speed and fuel efficiency distribution computation unit 13 functions to obtain the data when the same user travels back and forth the same section a plurality of times, from the travel information database 12. In addition, the vehicle speed and fuel efficiency distribution computation unit 13 functions to compute a difference of the average vehicle speed and the fuel efficiency in the forward path (first direction) when the user travels the section and to compute a difference of the average vehicle speed and the fuel efficiency in the backward path (second direction). For example, as illustrated in FIG. 3, in a graph in which the average vehicle speed is denoted in a horizontal axis and the fuel efficiency is denoted in a vertical axis, each piece of data is plotted when the vehicle 2 travels in the direction (first direction) heading toward a point B from a point A, and each piece of data is plotted when the vehicle 2 travels in the direction (second direction) heading toward the point A from the point B. In addition, the vehicle speed and fuel efficiency distribution computation unit 13 can compute average vehicle speed dispersion and fuel efficiency dispersion.

The slope estimation unit 14 functions to estimate the slope of a computation object section from a difference pattern of the fuel efficiency computed by the vehicle speed and fuel efficiency distribution computation unit 13. The slope estimation unit 14 functions to compare the fuel efficiency in the forward path with the fuel efficiency in the backward path. In addition, the slope estimation unit 14 functions to estimate the slope of the computation object section by performing the comparison, based on a difference between the fuel efficiency in the forward path and the fuel efficiency in the backward path.

Here, there is a tendency that a required energy becomes lower and the fuel efficiency becomes higher, when the vehicle travels a downhill slope, as compared with when the vehicle travels an uphill slope. The slope estimation unit 14 estimates the slope using this tendency. Specifically, in a case where the fuel efficiency when the vehicle travels in the direction of the point A from the point B is higher compared to the fuel efficiency when the vehicle travels in the direction of the point B from the point A, the slope estimation unit 14 estimates that an AB section is the uphill slope heading toward the direction of the point B from the point A. On the other hand, in a case where the fuel efficiency when the vehicle travels in the direction of the point B from the point A is higher compared to the fuel efficiency when the vehicle travels in the direction of the point A from the point B, the slope estimation unit 14 estimates that the AB section is the downhill slope heading toward the direction of the point B from the point A.

In addition, when the vehicle travels the uphill slope, there is a tendency that the difference of the fuel efficiency becomes low and the fuel efficiency dispersion becomes low. On the other hand, when the vehicle travels the downhill slope, there is a tendency that the difference of the fuel efficiency becomes high and the fuel efficiency dispersion becomes high. Thus, the slope estimation unit 14 may estimate the slope in consideration of the fuel efficiency dispersion in addition to the difference of the fuel efficiency. It is possible to more reliably estimate the slope by considering not only the fuel efficiency dispersion but also the difference of the fuel efficiency. Specifically, in a case where the fuel efficiency dispersion when the vehicle travels in the direction of the point A from the point B is higher compared to the fuel efficiency dispersion when the vehicle travels in the direction of the point B from the point A, and the fuel efficiency when the vehicle travels in the direction of the point A from the point B is higher compared to the fuel efficiency when the vehicle travels in the direction of the point B from the point A, the slope estimation unit 14 estimates that the AB section is the uphill slope heading toward the direction of the point B from the point A. In addition, in a case where the fuel efficiency dispersion when the vehicle travels in the direction of the point B from the point A is higher compared to the fuel efficiency dispersion when the vehicle travels in the direction of the point A from the point B, and the fuel efficiency when the vehicle travels in the direction of the point B from the point A is higher compared to the fuel efficiency when the vehicle travels in the direction of the point A from the point B, the slope estimation unit 14 estimates that the AB section is the downhill slope heading toward the direction of the point B from the point A.

Next, specific information processing of the information processing system 100 will be described with reference to FIGS. 2 to 4. In the present embodiment, the center server 1 continuously obtains vehicle state data concerning the travel from a predetermined vehicle 2 and performs the processing when the center server 1 seeks the slope of a predetermined section. This processing is repeatedly performed at a predetermined timing while the center server 1 operates. Herein, based on the data which is obtained when a certain vehicle 2 travels the AB section back and forth a plurality of times (for example, in a case where the vehicle 2 is used for a daily commute, the section between the house and the company corresponds to the AB section), an example of the processing when the slope of the AB section is extended will be described. Whenever the vehicle 2 travels back and forth the AB section, "data heading toward the point B from the point A" and "data heading toward the point A from the point B" are plotted in the graph (horizontal axis is an average vehicle speed and vertical axis is fuel efficiency) illustrated in FIG. 3.

Figure 2:
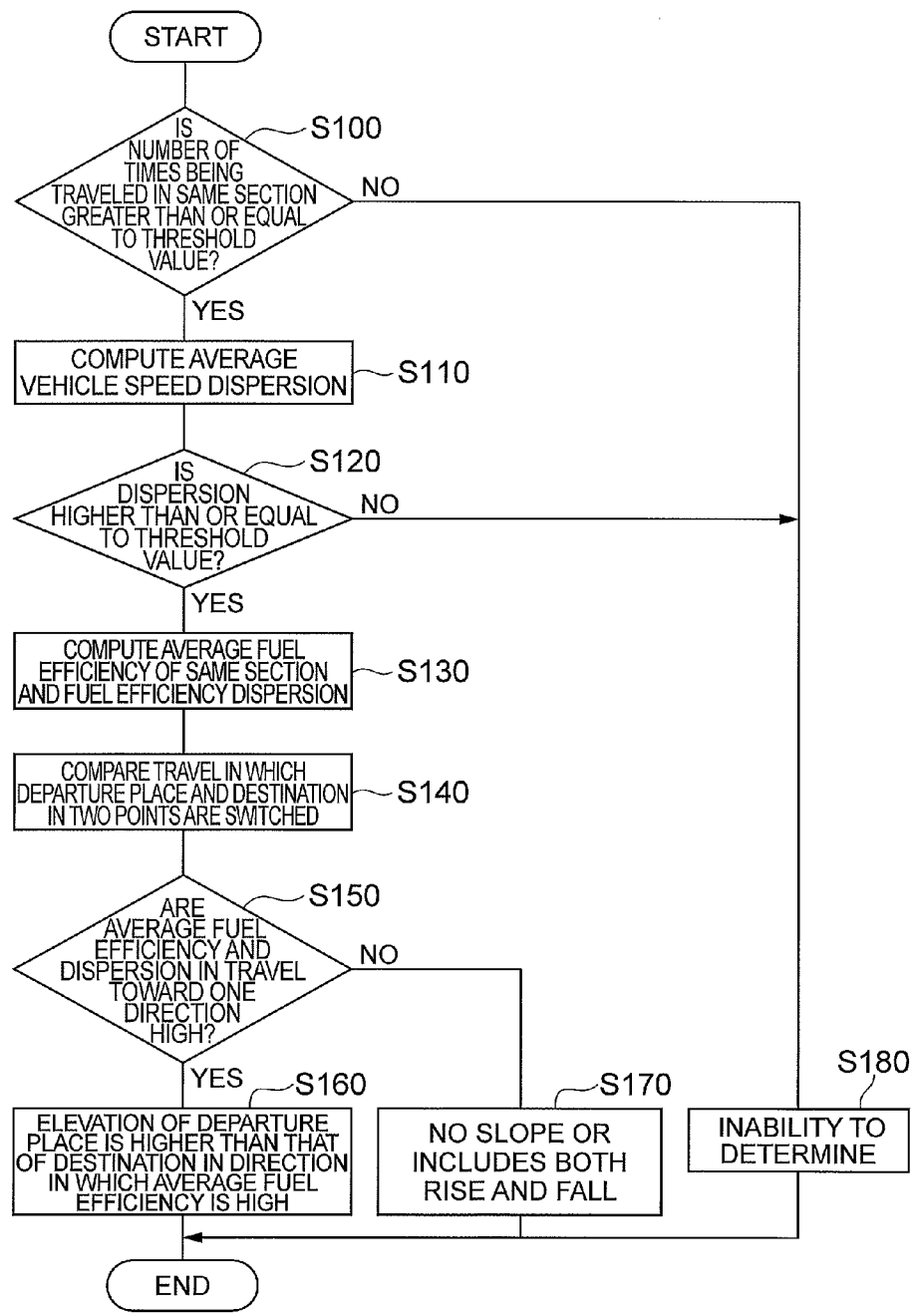
FIG. 2 is a flowchart illustrating processing content of the information processing system.

As illustrated in FIG. 2, the vehicle speed and fuel efficiency distribution computation unit 13 determines whether or not the number of times being traveled in the same section is greater than or equal to a threshold value (step S100). In a case where there is not enough number of pieces of data to compute the slope, it is impossible to perform the estimation of the slope. The vehicle speed and fuel efficiency distribution computation unit 13 determines whether or not the number of times being traveled in the AB section is greater than or equal to the threshold value. In a case where the number of times being traveled is determined to be smaller than the threshold value, the center server 1 decides that the slope cannot be determined (step S180) and ends the processing illustrated in FIG. 2. The center server 1 obtains the data again and performs the processing illustrated in FIG. 2 again.

In a case where the number of times being traveled is determined to be greater than or equal to the threshold value in step S100, the vehicle speed and fuel efficiency distribution computation unit 13 computes the average vehicle speed dispersion in the section (step S110). For example, as illustrated in (1) of FIG. 3 (*a*), the vehicle speed and fuel efficiency distribution computation unit 13 computes the average vehicle speed dispersion in each block when the vehicle travels toward the point B from the point A. In addition, the vehicle speed and fuel efficiency distribution computation unit 13 determines whether or not the dispersion computed in step S110 is higher than or equal to the threshold value (step S120). In a case where there are only pieces of data under the same speed condition even though there are a plurality of pieces of travel data, it is unclear what tendency the plot show when the speed condition is changed. However, by means of the processing in step S120, the tendency of the plot in all the speed conditions can be verified. In step S120, in a case where the dispersion is determined to be lower than the threshold value, the center server 1 decides that the slope cannot be determined (step S180) and ends the processing illustrated in FIG. 2. The center server 1 obtains the data again and performs the processing illustrated in FIG. 2 again.

In a case where the dispersion is determined to be higher than or equal to the threshold value in step S120, the vehicle speed and fuel efficiency distribution computation unit 13 computes an average fuel efficiency and the fuel efficiency dispersion in the section (step S130). For example, as illustrated in (2) of FIG. 3, the vehicle speed and fuel efficiency distribution computation unit 13 computes the average fuel efficiency in each block when the vehicle travels toward the point B from the point A. In addition, as illustrated in (3) of FIG. 3, the vehicle speed and fuel efficiency distribution computation unit 13 computes the fuel efficiency dispersion in each block when the vehicle travels toward the point B from the point A.

Next, in a case where the departure place and the destination in the section are switched, the vehicle speed and fuel efficiency distribution computation unit 13 computes the average fuel efficiency and the fuel efficiency dispersion, and the slope estimation unit 14 compares the computation result with a computation result in step S130 (step S140). For example, the vehicle speed and fuel efficiency distribution computation unit 13 sets "departure place: point B" and "destination: point A", while it is set as "departure place: point A" and "destination: point B" in the computation in step S130, and computes the average fuel efficiency and the fuel efficiency dispersion in each block when the vehicle travels toward the point A from the point B. Then, as illustrated in (4) of FIG. 3, the slope estimation unit 14 performs a comparison of each piece of data.

Next, the slope estimation unit 14 determines whether or not the average fuel efficiency in the travel toward one direction in the section is higher than that in the travel toward the other direction in the section and the fuel efficiency dispersion in the travel toward one direction in the section is higher than that in the travel toward the other direction in the section (step S150). In a case where it is determined that the average fuel efficiency in the travel toward one direction is higher than that in the travel toward the other direction and the fuel efficiency dispersion in the travel toward one direction is higher than that in the travel toward the other direction, by means of the determination, the slope estimation unit 14 determines that an elevation of the departure place is higher than that of the destination in the travel toward the direction in which the fuel efficiency is high (step S160). Here, a threshold value with respect to a difference in the average fuel efficiency and a threshold value with respect to a difference in the fuel efficiency dispersion are set in advance, and it is determined whether or not each value is higher than or equal to each threshold value.

In other words, in a case where the average fuel efficiency in the travel toward the point B from the point A is high and the fuel efficiency dispersion is high, the slope estimation unit 14 determines that the section is the downhill slope (elevation of the departure place A side is high) heading toward the point B from the point A. For example, the AB section is estimated to be the slope as illustrated in FIG. 4 (*c*). In addition, in a case where the average fuel efficiency in the travel toward the point A from the point B is high and the fuel efficiency dispersion is high, the slope estimation unit 14 determines that the section is the uphill slope (elevation of the departure place B side is high) heading toward the point B from the point A. For example, the AB section is estimated to be the slope as illustrated in FIG. 4(*b*).

On the other hand, in a case where a difference in the average fuel efficiency in each direction is small or in a case where a difference in the fuel efficiency dispersion is small, the slope estimation unit 14 determines that the section is a section without a slope or that the section is a section including both a rise and a fall (step S170). For example, in a case where the average fuel efficiency in the travel toward the point B from the point A and the difference in the average fuel efficiency in the travel toward the point A from the point B are smaller than the threshold value, or in a case where the fuel efficiency dispersion in the travel toward the point B from the point A and the difference in the fuel efficiency dispersion in the travel toward the point A from the point B are smaller than the threshold value, the slope estimation unit 14 determines as described in step S170. For example, the AB section is determined to be s section without a slope as illustrated in FIG. 4 (*a*). Alternately, since the AB section has a reverse point of the rise and the fall at a middle position as illustrated in FIG. 4 (*d*), as a result, it is determined to be a section that has no difference in fuel efficiency in the traveling back and forth between the point A and the point B.

For example, in a plot example of FIG. 3 (*a*), in the travel toward the point B from the point A, the difference of the fuel efficiency in each plot is not high and hardened near the average fuel efficiency. In other words, the fuel efficiency dispersion is low. In addition, the average fuel efficiency is also low. On the other hand, in the travel toward the point A from the point B, the difference of the fuel efficiency in each plot is high. In other words, the fuel efficiency dispersion is high. In addition, the average fuel efficiency is also high and a difference between the average fuel efficiency of the travel toward the point A from the point B and the average fuel efficiency of the travel toward the point B from the point A is large. In such a case, the slope estimation unit 14 outputs the estimation result in step S160. On the other hand, in a plot example of FIG. 3 (*b*), in the travel toward the point B from the point A, the difference of the fuel efficiency in each plot is high and the fuel efficiency dispersion is high. In addition, the average fuel efficiency is also high. On the other hand, in the travel toward the point A from the point B, the difference of the fuel efficiency in each plot is high and the fuel efficiency dispersion is high. In addition, the average fuel efficiency is also high. In the travel toward the point A from the point B and the travel toward the point B from the point A, a difference in the fuel efficiency dispersion and a difference in the average fuel efficiency are not large. In such a case, the slope estimation unit 14 outputs the estimation result in step S170.

After the estimation result in step S160 or S170 is computed, the center server 1 accumulates the estimation results. The center server 1 reflects information such as "the AB section is a downhill (uphill) slope in a map" in a map database included therein. Thereby, even though an investigator does not visit actually the AB section to perform a slope investigation, he or she can reflect the slope information in the database of the center server 1. In addition, the center server 1 can estimate the slopes of all the sections by obtaining not only the information from one vehicle 2 but also the information from a plurality of vehicles 2. The center server 1 transmits the obtained slope information to each vehicle 2. Thereby, each vehicle 2 can perform more efficient travel control. For example, when traveling back and forth in a predetermined section, in consideration of slope situations of going and returning (for example, the going is an uphill slope, but the returning is a downhill slope), the vehicle 2 can make an SOC control plan or a control plan in which either electricity or gasoline is used by priority as an energy source for the travel.

Next, the information processing system 100 according to the present embodiment and the operation and effect of the center server 1 will be described.

The information processing system 100 can estimate the slope of the AB section using the information based on an actual travel in the AB section, based on the difference between the fuel efficiency in the direction (forward path) heading toward the point B from the point A and the fuel efficiency in the direction (backward path) heading toward the point A from the point B. In other words, with regard to the AB section, the slope can be estimated by simply comparing the respective fuel efficiencies with each other when the vehicle moves in the directions different from each other. Thus, in the method, taking the consistency of parameter conditions is easier than the method of the related art and a computation can be simply performed. In addition, it is unnecessary to prepare any reference fuel efficiency because the estimation based on the movement of the actual vehicle 2 is performed, whereby it is possible to be applied to all kinds of movable bodies. As described above, according to the information processing system 100, the slope can be estimated by a simple computation.

For example, when the investigator is trying to obtain the slope information as map information, a method in which the slope information is obtained according as the investigator performs a field investigation is generally employed. However, it is necessary to perform a field investigation on the road across the country in order to incorporate the slope information into the map information and it will take a great deal of cost. In addition, there is also a case where the slope is changed by a road construction and it takes further cost to update the information. In addition, when one is trying to obtain the slope information on a portion only required for the travel of a certain vehicle, it is very difficult to perform the field investigation by specifying the required portion. However, for example, the information processing system 100 according to the present embodiment can estimate the slope of a commute section, based on round-trip travel data of commute time of a specific vehicle 2. Thereby, without actually performing the field investigation or the like, the slope of only the required section can be estimated. Even though the slope is changed, it is possible to promptly update the data based on the actual travel data.

The present invention is not limited to the above-described embodiment.

For example, in the above-described embodiment, the center server 1 performs the slope estimation processing and the vehicle 2 only outputs the vehicle state data to the center server 1. However, an information processing device mounted on the vehicle 2 may perform the slope estimation according to the above-described method. After the slope is estimated with respect to a predetermined section, the information processing device of the vehicle 2 transmits the slope information to the center server 1.

In addition, in the above-described embodiment, the computation is performed based on the fuel efficiency and the average vehicle speed only between the departure place (point A) and the destination (point B) in one trip. In addition to this, the point A and the point B are divided into smaller sub-sections and each slope of the sub-sections may be estimated.

For example, when the estimation result such as step S170 illustrated in FIG. 2 is obtained, the slope estimation unit 14 may further review whether the AB section is flat as illustrated in FIG. 4 (*a*) or a slope which falls once and rises toward the point B from the point A as illustrated in FIG. 4 (*d*). For example, a mid-point is set in the middle position of the point A and the point B, and then the processing of steps S130 to S150 may be performed with regard to the point A to the mid-point and the processing of steps S130 to S150 may be performed with regard to the mid-point to the point B (at this time, the information on the vehicle speed, the fuel efficiency, or the like with respect to each sub-section already can be obtained from the travel information database 12. The same is applied to the following description). If such processing is performed, in a case where the slope of the AB section is like FIG. 4 (*a*), the slope estimation unit 14 estimates that both a sub-section between the point A and the mid-point and a sub-section between the mid-point and the point B are flat. In a case where the slope of the AB section is like FIG. 4 (*d*), the slope estimation unit 14 estimates that the sub-section between the point A and the mid-point is the downhill slope and the sub-section between the mid-point and the point B is the uphill slope. In addition, since there is also a case where a position of a switching point of the rise and the fall is shifted from a middle position, even in a case like FIG. 4 (d), further, the slope estimation unit 14 may estimate by moving a middle point and further set a plurality of middle points.

In addition, as illustrated in FIG. 4 (e), there is also a case where the rise and the fall between the point A and the point B are repeated a plurality of times. Further, even in a case where the estimation result comes out that the elevation of one of the point A and the point B is higher than the other as described in step S160, there is also a case where the rise and the fall between the point A and the point B are repeated a plurality of times. In consideration of such a case as well, the number, the range, and the method for dividing into sub-sections can be changed variously, whereby the processing of steps S130 to S150 may be repeated. For example, when the estimation result is not changed even though the method or the like for dividing into the sub-sections is changed variously, the slope estimation unit 14 can conclude that a shape of the slope is fixed. Thereby, it is possible to estimate more correct slope.

Industrial Applicability

The present invention can be used for an information processing system estimating a slope and an information processing device.

Reference Signs List

1 . . . center server (information processing device)
2 . . . vehicle (movable body)
10 . . . communication device (fuel efficiency information obtainment unit)
11 . . . travel information storage unit (fuel efficiency information obtainment unit)
12 . . . travel information database (fuel efficiency information obtainment unit)
13 . . . vehicle speed and fuel efficiency distribution computation unit (fuel efficiency information obtainment unit)
14 . . . slope estimation unit (comparison unit, slope estimation unit)
21 . . . communication device (fuel efficiency information obtainment unit)
22 . . . vehicle state sensor (fuel efficiency information obtainment unit)
100 . . . information processing system

The invention claimed is:

1. An information processing system which includes a center server and a movable body performing a communication with the center server, the information processing system comprising:
a processor that is configured to:
obtain information on fuel efficiency when the movable body moves in a first direction heading toward a second point from a first point in a predetermined section and obtain information on fuel efficiency when the movable body moves in a second direction heading toward the first point from the second point in the predetermined section;
compare the fuel efficiency in the first direction with the fuel efficiency in the second direction;
estimate a slope of the predetermined section based on a difference between the fuel efficiency in the first direction and the fuel efficiency in the second direction; and
perform a control plan for energy source of the movable body using the estimated slope when the movable boy is traveling.

2. The information processing system according to claim 1, wherein the processor is configured to estimate that the predetermined section is in an uphill slope heading toward the first direction in a case where the fuel efficiency in the second direction is higher than the fuel efficiency in the first direction, and that the predetermined section is in a downhill slope heading toward the first direction in a case where the fuel efficiency in the first direction is higher than the fuel efficiency in the second direction.

3. The information processing system according to claim 2, wherein the processor is configured to estimate that the predetermined section is in the uphill slope heading toward the first direction in a case where fuel efficiency dispersion in the second direction is higher than fuel efficiency dispersion in the first direction and the fuel efficiency in the second direction is higher than the fuel efficiency in the first direction, and that the predetermined section is in the downhill slope heading toward the first direction in a case where the fuel efficiency dispersion in the first direction is higher than the fuel efficiency dispersion in the second direction and the fuel efficiency in the first direction is higher than the fuel efficiency in the second direction.

4. An information processing device comprising:
a processor that is configured to:
obtain information on fuel efficiency when a movable body moves in a first direction heading toward a second point from a first point in a predetermined section and obtain information on fuel efficiency when the movable body moves in a second direction heading toward the first point from the second point in the predetermined section;
compare the fuel efficiency in the first direction with the fuel efficiency in the second direction;
estimate a slope of the predetermined section based on a difference between the fuel efficiency in the first direction and the fuel efficiency in the second direction; and
perform a control plan for energy source of the movable body using the estimated slope when the movable boy is traveling.

* * * * *